(12) United States Patent
Bk et al.

(10) Patent No.: US 8,380,668 B2
(45) Date of Patent: Feb. 19, 2013

(54) AUTOMATIC DISCOVERY OF CACHE MIRROR PARTNERS IN AN N-NODE CLUSTER

(75) Inventors: Girish Kumar Bk, Bangalore (IN); Arindam Banerjee, Bangalore (IN)

(73) Assignee: LSI Corporation, Milpitas, CA (US)

( * ) Notice: Subject to any disclaimer, the term of this patent is extended or adjusted under 35 U.S.C. 154(b) by 0 days.

(21) Appl. No.: 13/165,883

(22) Filed: Jun. 22, 2011

(65) Prior Publication Data

US 2012/0330898 A1    Dec. 27, 2012

(51) Int. Cl.
   *G06F 17/30* (2006.01)
(52) U.S. Cl. ........ 707/626; 707/627; 707/628; 707/629; 707/630; 707/631
(58) Field of Classification Search ........... 707/626–631
   See application file for complete search history.

(56) References Cited

U.S. PATENT DOCUMENTS

| | | | |
|---|---|---|---|
| 7,093,182 B2 | 8/2006 | Dickson | |
| 7,111,194 B1 | 9/2006 | Schoenthal et al. | |
| 7,191,251 B2 | 3/2007 | Watanabe et al. | |
| 7,266,717 B2 | 9/2007 | Cassell et al. | |
| 7,321,982 B2 | 1/2008 | Coatney et al. | |
| 7,392,425 B1 | 6/2008 | Schoenthal et al. | |
| 7,529,784 B2 | 5/2009 | Kavuri et al. | |
| 7,580,950 B2 | 8/2009 | Kavuri et al. | |
| 7,617,227 B2 | 11/2009 | Watanabe et al. | |
| 7,627,617 B2 | 12/2009 | Kavuri et al. | |
| 7,664,913 B2 | 2/2010 | Cassell et al. | |
| 7,805,566 B2 | 9/2010 | Abouelwafa et al. | |
| 2006/0112219 A1 | 5/2006 | Chawla et al. | |
| 2007/0103984 A1 | 5/2007 | Kavuri et al. | |
| 2007/0130168 A1 | 6/2007 | Watanabe et al. | |
| 2007/0220059 A1* | 9/2007 | Lu et al. | 707/200 |
| 2007/0283092 A1 | 12/2007 | Cassell et al. | |
| 2008/0077635 A1 | 3/2008 | Sporny et al. | |
| 2008/0244174 A1 | 10/2008 | Abouelwafa et al. | |
| 2009/0254572 A1 | 10/2009 | Redlich et al. | |
| 2009/0287880 A1* | 11/2009 | Wright et al. | 711/114 |
| 2010/0250497 A1 | 9/2010 | Redlich et al. | |

FOREIGN PATENT DOCUMENTS

| | | |
|---|---|---|
| EP | 1450260 | 8/2006 |
| EP | 1709535 | 1/2008 |
| WO | 2006019955 | 2/2006 |
| WO | 2006026053 | 3/2006 |
| WO | 2006055191 | 5/2006 |
| WO | 2007028158 | 3/2007 |

* cited by examiner

*Primary Examiner* — Baoquoc N To
(74) *Attorney, Agent, or Firm* — William W. Cochran; Cochran Freund & Young LLC

(57) ABSTRACT

Partner mirroring is provided with tray loss protection in an N node storage cluster architecture. A master proxy receives and records broadcasts of nodes in a cluster and selects mirror partners in a round robin fashion, so that even numbered nodes are mirrored with other even numbered nodes and odd numbered nodes are mirrored with other odd numbered nodes. In an N node storage cluster architecture which includes a cluster of dual controllers, tray loss protection is provided using such an odd numbered and even numbered mirror pairing process.

12 Claims, 10 Drawing Sheets

US 8,380,668 B2

AUTOMATIC DISCOVERY OF CACHE MIRROR PARTNERS IN AN N-NODE CLUSTER

BACKGROUND

RAID arrays may be configured in ways that provide redundancy and error recovery without any loss of data. RAID arrays may also be configured to increase read and write performance by allowing data to be read or written simultaneously to multiple disk drives. RAID arrays may also be configured to allow "hot-swapping" which allows a failed disk to be replaced without interrupting the storage services of the array. The 1987 publication by David A. Patterson, et al., from the University of California at Berkeley titled "A Case for Redundant Arrays of Inexpensive Disks (RAID)" discusses the fundamental concepts and levels of RAID technology.

RAID storage systems typically utilize a controller that shields the user or host system from the details of managing the storage array. The controller makes the storage array appear as one or more disk drives (or volumes). This is accomplished in spite of the fact that the data (or redundant data) for a particular volume may be spread across multiple disk drives.

SUMMARY

An embodiment of the present invention may therefore comprise a process for establishing mirror partners in an N node storage cluster architecture to provide tray loss protection in the N node cluster comprising: selecting a master node from nodes in the N node cluster; communicating status and profile information of each node in the N node cluster on cluster communication network to other nodes in the N node cluster, including the master node; recording the status and profile information in the master node; selecting mirror partners, using the master node, by matching odd numbered nodes with next available odd numbered nodes and even numbered nodes with next available even numbered nodes, so that each of the nodes in the N node cluster have mirroring partners that are in different enclosures to provide tray loss protection.

An embodiment of the present invention may further comprise a system for locating mirror partners comprising: a cluster of controllers that are interconnected between a plurality of hosts and a plurality of storage drives; a plurality of enclosures that house the controllers; DRAM disposed in each of the controllers that is partitioned for storage and mirroring of data from other controllers; a cluster communication network that interconnects the controllers; a master controller that selects a mirror partner for each controller in the N node cluster, such that odd numbered nodes have a mirror partner that is the next available odd numbered node as a minor partner, and even numbered nodes have the next available even numbered node as a mirror partner.

DETAILED DESCRIPTION OF THE PREFERRED EMBODIMENTS

Figure 1:
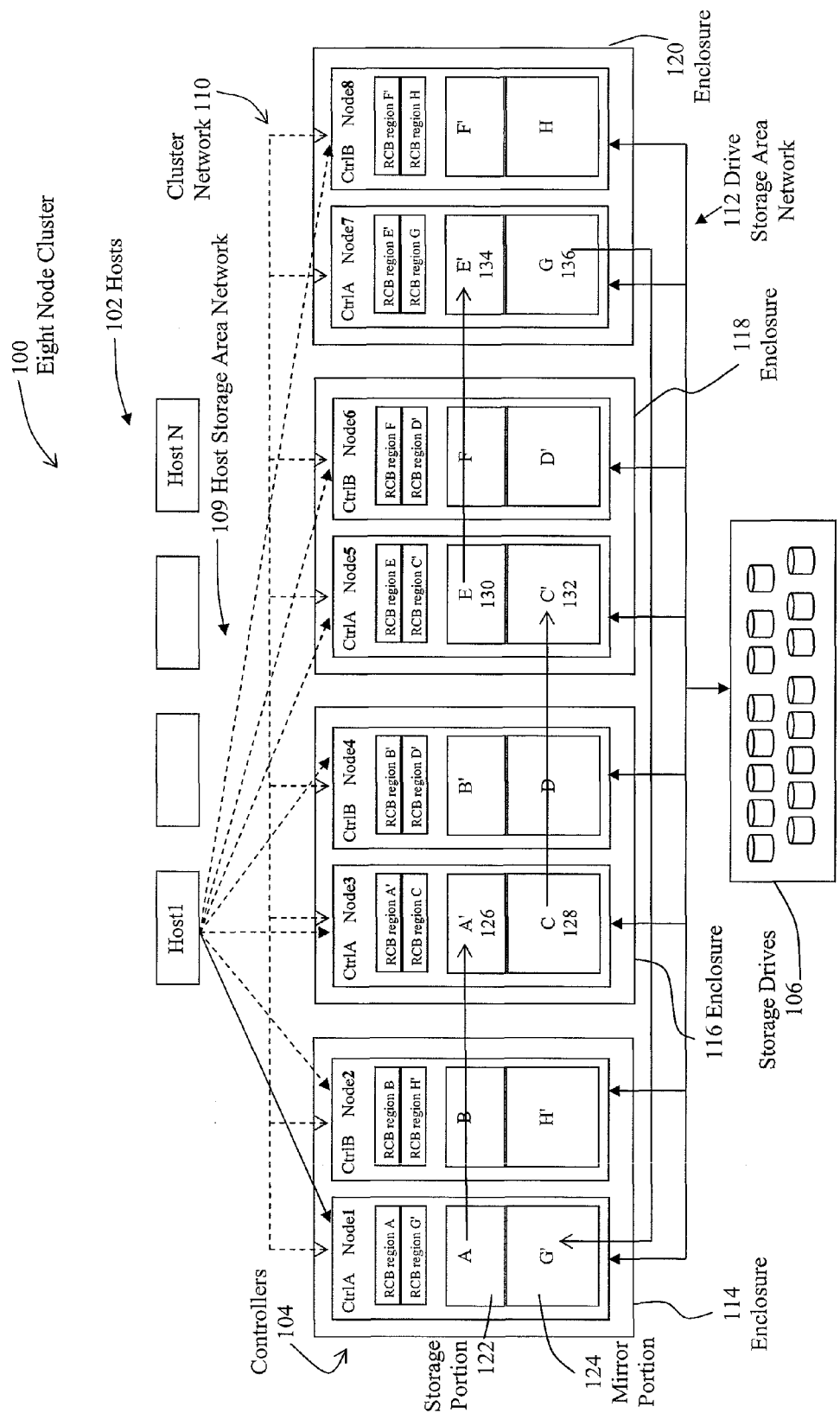
FIG. 1 is schematic illustration of an eight node cluster with round robin cache mirroring.

FIG. 1 is a schematic illustration of round robin cache mirroring in an eight node cluster 100. As illustrated in FIG. 1, hosts 102 are interconnected to a series of controllers 104. Controllers 104 control the reading and writing of data between hosts 102 and storage drives 106. Host storage area network 109 provides access between hosts 102 and controllers 104. Cluster network 110 controls the control path interconnection between the controllers 104 in the N node cluster illustrated in FIG. 1. Drive storage area network 112 provides access between controllers 104 and storage drives 106. Each of the controllers 104 is enclosed within an enclosure. Node 1 and node 2 are enclosed within enclosure 114. Node 3 and node 4 are enclosed within an enclosure 116. Node 5 and node 6 are enclosed within enclosure 118. Node 7 and node 8 are enclosed within enclosure 120. In this manner, two controllers are embedded within a single enclosure and share a common power source. The enclosures 114-120 are also referred to as trays. The DRAM cache in each of the controllers 104 is partitioned into a storage portion and a mirror portion. For example, node 1 has a storage portion 122 that stores data. Node 1 also has a mirror portion 124 that stores mirror data from another node, i.e., node 7.

As shown in FIG. 1, the eight node cluster 100 is configured to operate in a round robin mirroring scheme. Each of the nodes, illustrated in FIG. 1, mirrors data to the next available node in the eight node cluster 100 that is in a different enclosure in a round robin scheme, so that data is mirrored in a mirror portion of another node that is in a different enclosure or tray. As illustrated in FIG. 1, the storage of portion 122 of node 1 is mirrored in the mirror portion 126 of node 3. The storage portion 128 of node 3 is mirrored in the mirror portion 132 of node 5. The storage portion 130 of node 5 is mirrored in mirror portion 134 of node 7. The storage portion 136 of node 7 is mirrored in the mirror portion 124 of node 1. In this manner, the odd numbered nodes in the eight node cluster 100 are mirror partners, and mirroring of data does not occur in the same enclosure or tray. A similar mirroring scheme is used with the even numbered nodes. By mirroring data in different enclosures or trays, the round robin scheme, illustrated in FIG. 1, provides tray loss protection (TLP).

During Start of Day (SOD), and also when nodes join and leave a cluster, each of the nodes must go through a discovery routine to discover a mirror partner. In a round robin scheme with tray loss protection, an odd numbered node necessarily finds an odd numbered node mirror partner, while even numbered nodes finds an even numbered node mirror partner to preserve tray loss protection. In situations in which there are no mirror partners available with the same odd or even number, the odd and even pairing will be ignored and tray loss protection may not be available. Alternatively, odd and even number pairing may be ignored for performance reasons in which case mirror partners could be on the same enclosure or on different enclosure depending upon the availability of nodes.

Figure 2:
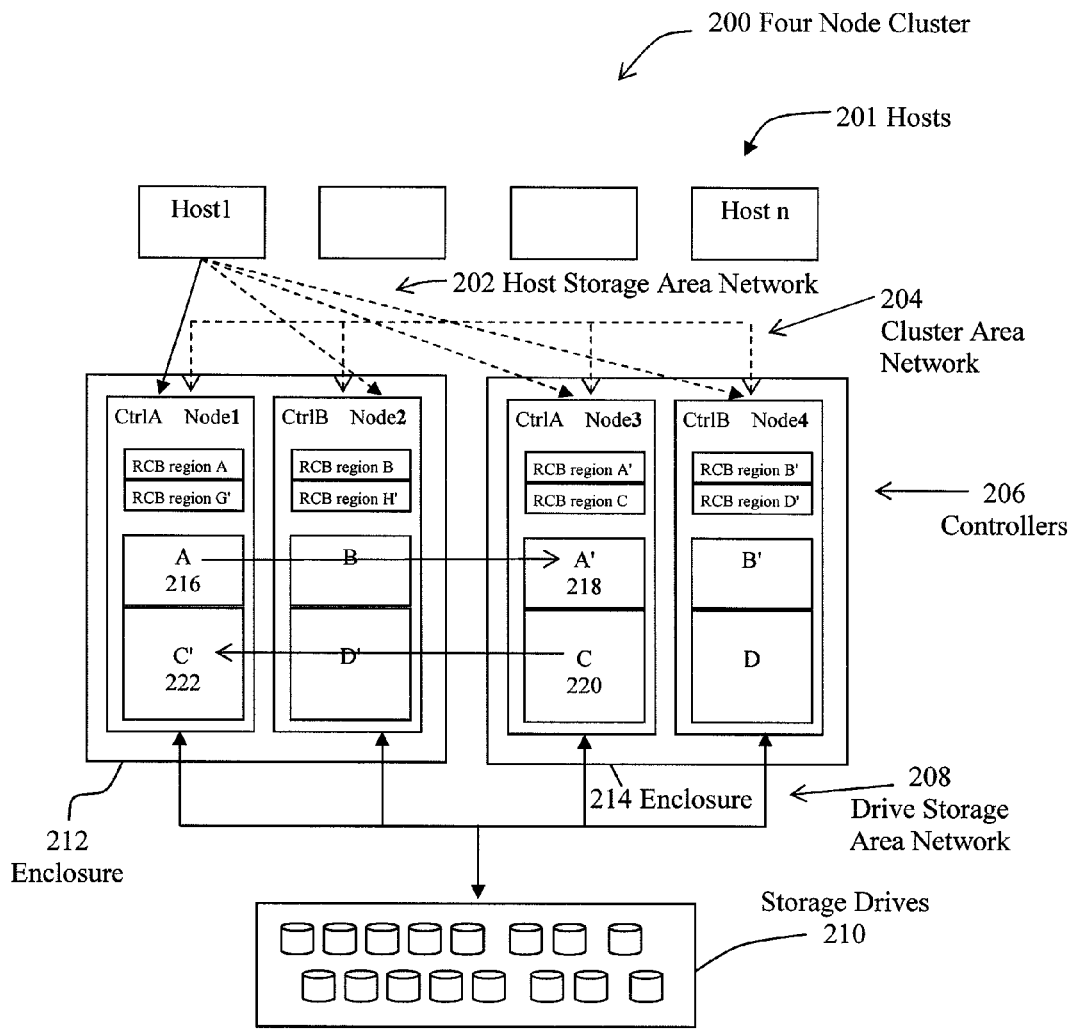
FIG. 2 is a schematic illustration of a four node cluster with round robin cache mirroring.

FIG. 2 is a schematic illustration of a four node cluster 200 using round robin mirroring. As illustrated in FIG. 2, hosts 201 are interconnected with controllers 206 via host storage area network 202. Cluster area network 204 provides interconnection between the various nodes (controllers 206) in the cluster illustrated in FIG. 2. Drive storage area network 208 provides interconnection between controllers 206 and storage drives 210. As also illustrated in FIG. 2, node 1 and node 2 are disposed in enclosure 212. Node 3 and node 4 are disposed in enclosure 214.

The four node cluster 200, illustrated in FIG. 2, uses the same round robin scheme of mirroring as disclosed in FIG. 1, except that the cluster of FIG. 2 is a four node cluster 200. For example, storage area 216 of node 1 is mirrored in mirror storage area 218 of node 3. Storage area 220 of node 3 is mirrored in mirror storage area 222 of node 1. The even numbered nodes use the same round robin storage techniques of mirroring. Using odd numbered mirror partners for odd numbered nodes and even numbered mirror partners for even numbered nodes provides tray loss protection for the data.

Figure 3:
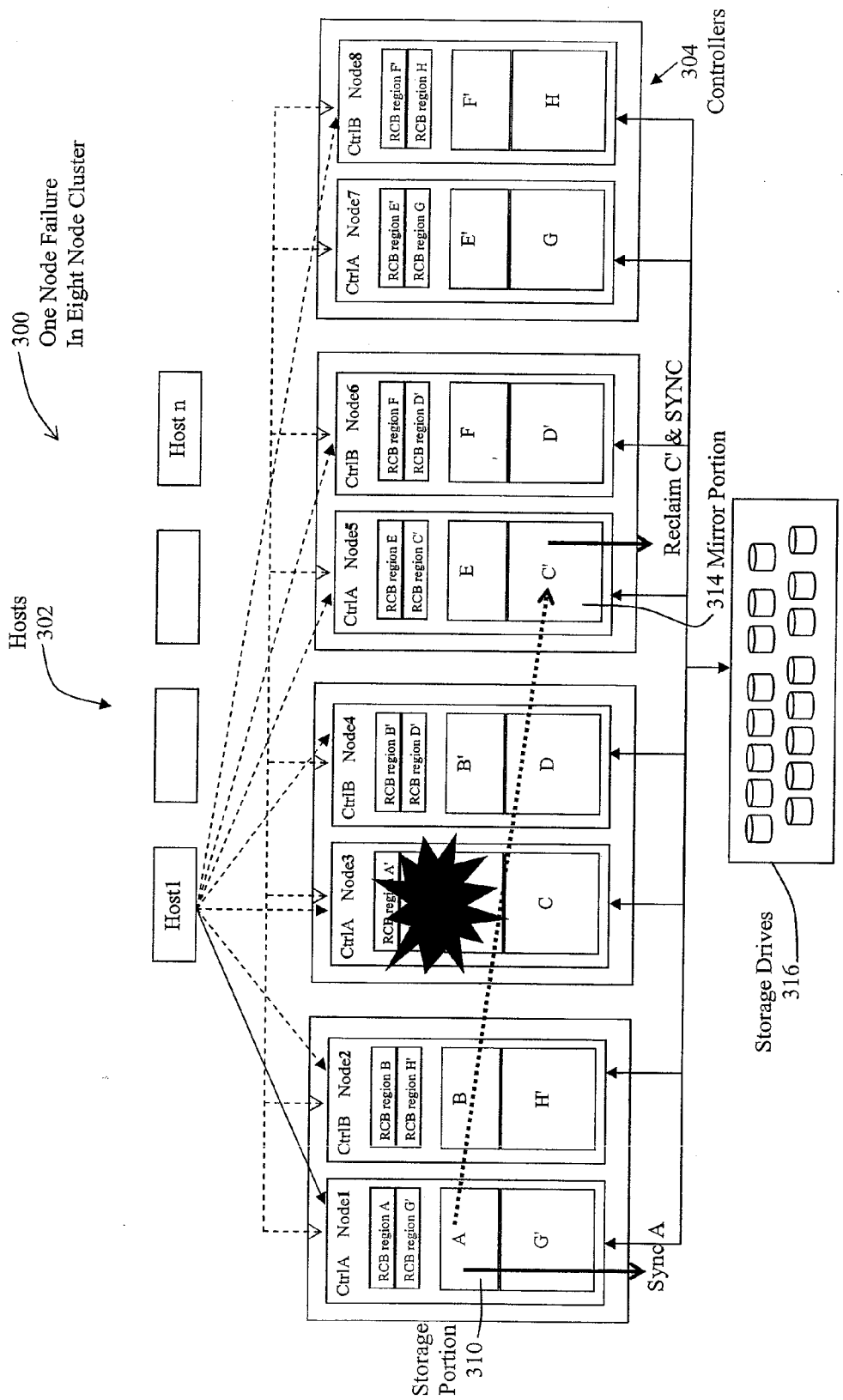
FIG. 3 is a schematic illustration of an eight node cluster with a single node failure.

FIG. 3 illustrates an eight node cluster with a single node failure recovery sequence. Again, hosts 302 are interconnected to controllers 304. Controllers 304 are interconnected to the storage drives 316. As shown in FIG. 3, node 3 has experienced a failure. As such, storage portion 310 of node 1 finds the next available odd numbered node to mirror data. The next mirror portion for an odd numbered node is mirror portion 314 of node 5. Hence, when node 1 detects that node 3 is unavailable, storage portion 310 of node 1 transitions its volumes with write-back and mirroring caching to write-through caching mode, without mirroring, until node 1 finds its new mirror partner, i.e., mirror portion 314 of node 5. On the other hand, mirror portion 314 of node 5 was the mirror partner for node 3. After failure of node 3, I/Os for node 3 will be directed to node 5, which triggers a volume takeover process by node 5. The takeover process involves Node 5 reclaiming node 3 cache (i.e., mirror portion 314), writing of the mirror portion data (which has lost its primary portion due to node 3 failure) to Storage Drives 316 and making the mirror portion 314 available for other nodes to use as a new mirror portion. Node 5 handles I/Os with write-back caching with mirroring, and takes the defined I/O load of node 3 and node 5. As such, with a single node failure, the cluster loses approximately 12.5 percent bandwidth, as viewed by the hosts 302.

Figure 4:
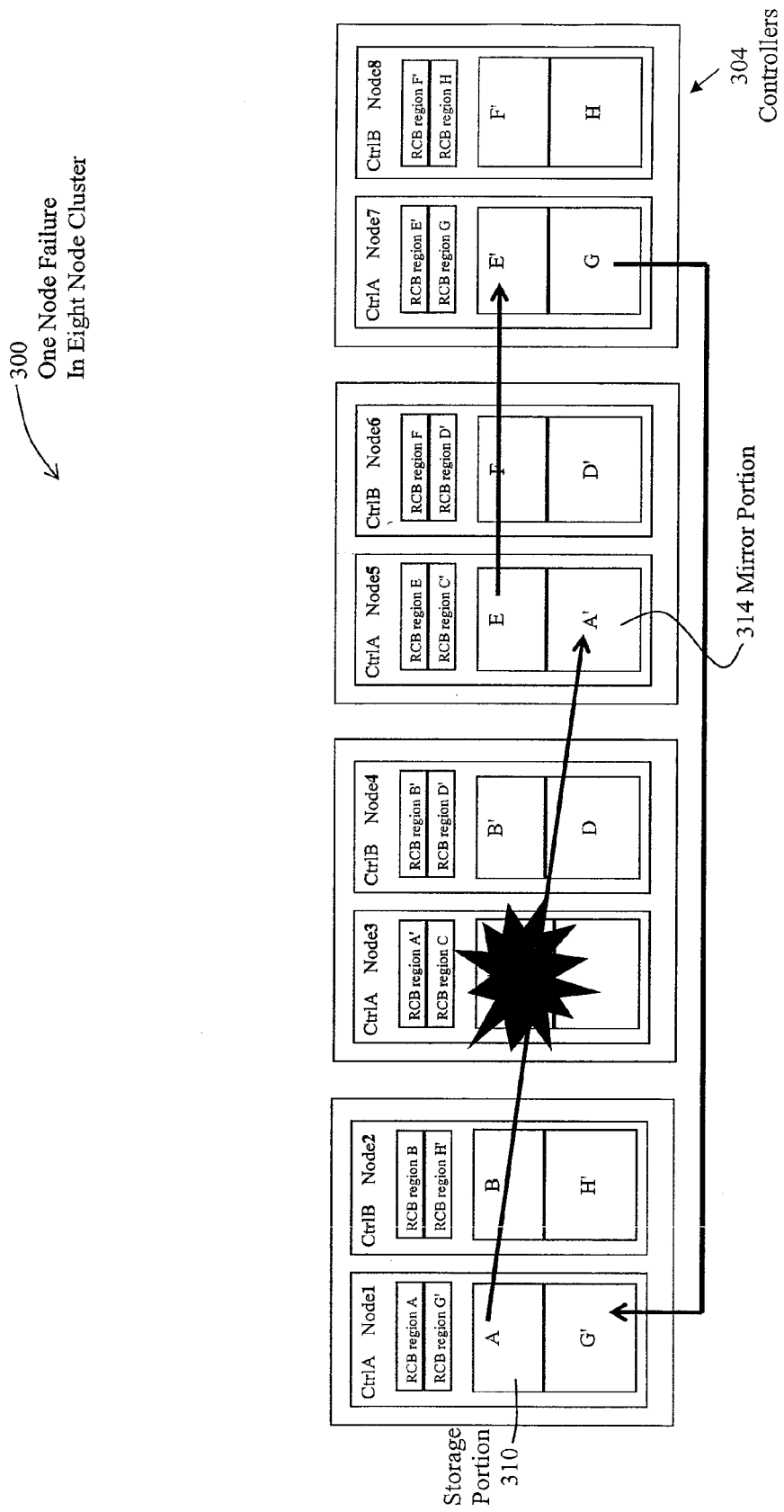
FIG. 4 is an illustration of the eight node cluster of FIG. 3, illustrating new minor relationships after a single node failure.

FIG. 4 illustrates the one node failure in the eight node cluster 300 of FIG. 3. As shown in FIG. 4, new mirroring relationships are established between the odd numbered nodes. Node 1 mirrors with node 5. Node 5 mirrors with node 7. Node 7 mirrors with node 1. In this fashion, node 1 reestablishes a mirroring relationship with node 5 and continues to operate in write back caching mode with mirroring.

Figure 5:
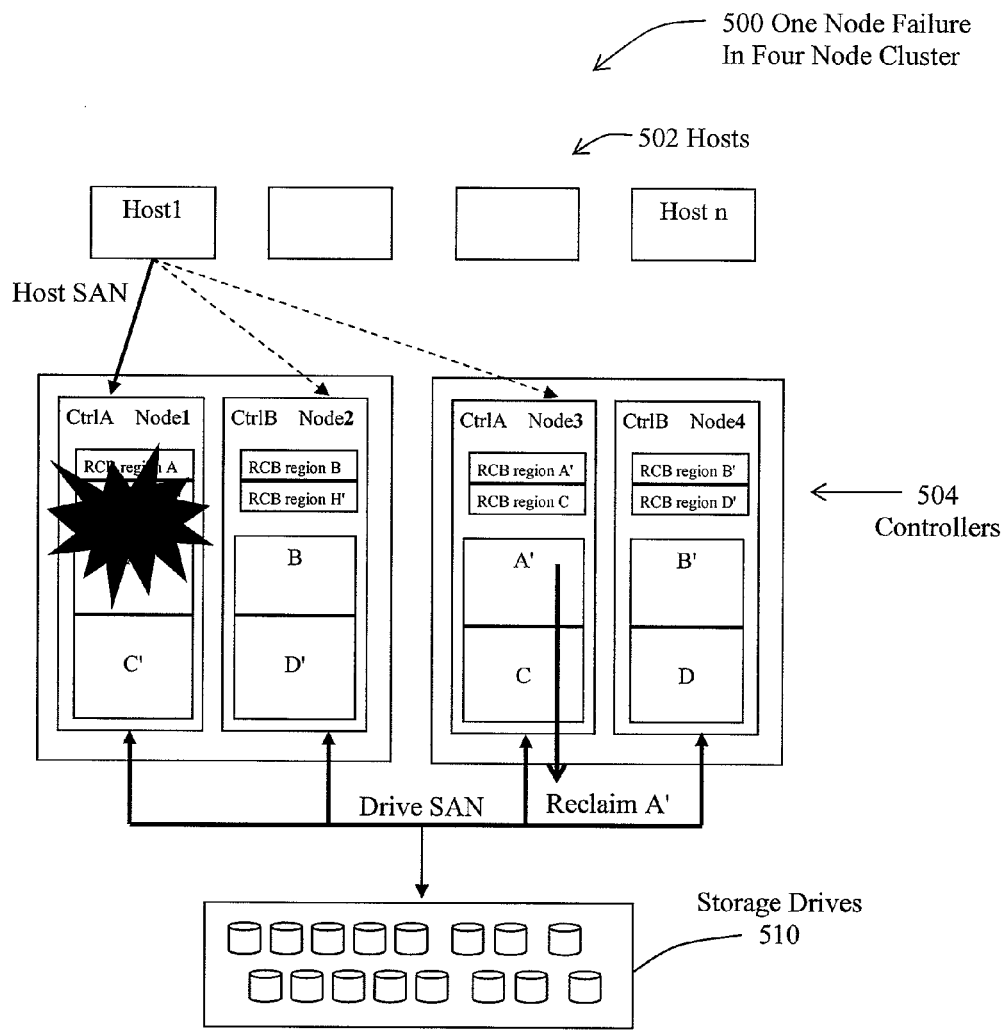
FIG. 5 is a schematic illustration of a four node cluster with a single node failure and recovery with tray loss protection.

FIG. 5 illustrates a four node cluster 500, which has a one node failure. As shown in FIG. 5, hosts 502 are interconnected with controllers 504. Controllers 504 are in communication with storage drives 510. When node 1 fails, node 3, which is the standby for node 1, takes over all of the volumes of node 1 and continues to operate in write-through, non-mirroring mode. Nodes 2 and 4 continue to operate in write-back caching mode with mirroring. In this scenario, nodes 2 and 4 are tray loss protected. The performance loss due to single node failure is greater than 25%, since one of the three surviving nodes is in write-through caching mode.

Figure 6:
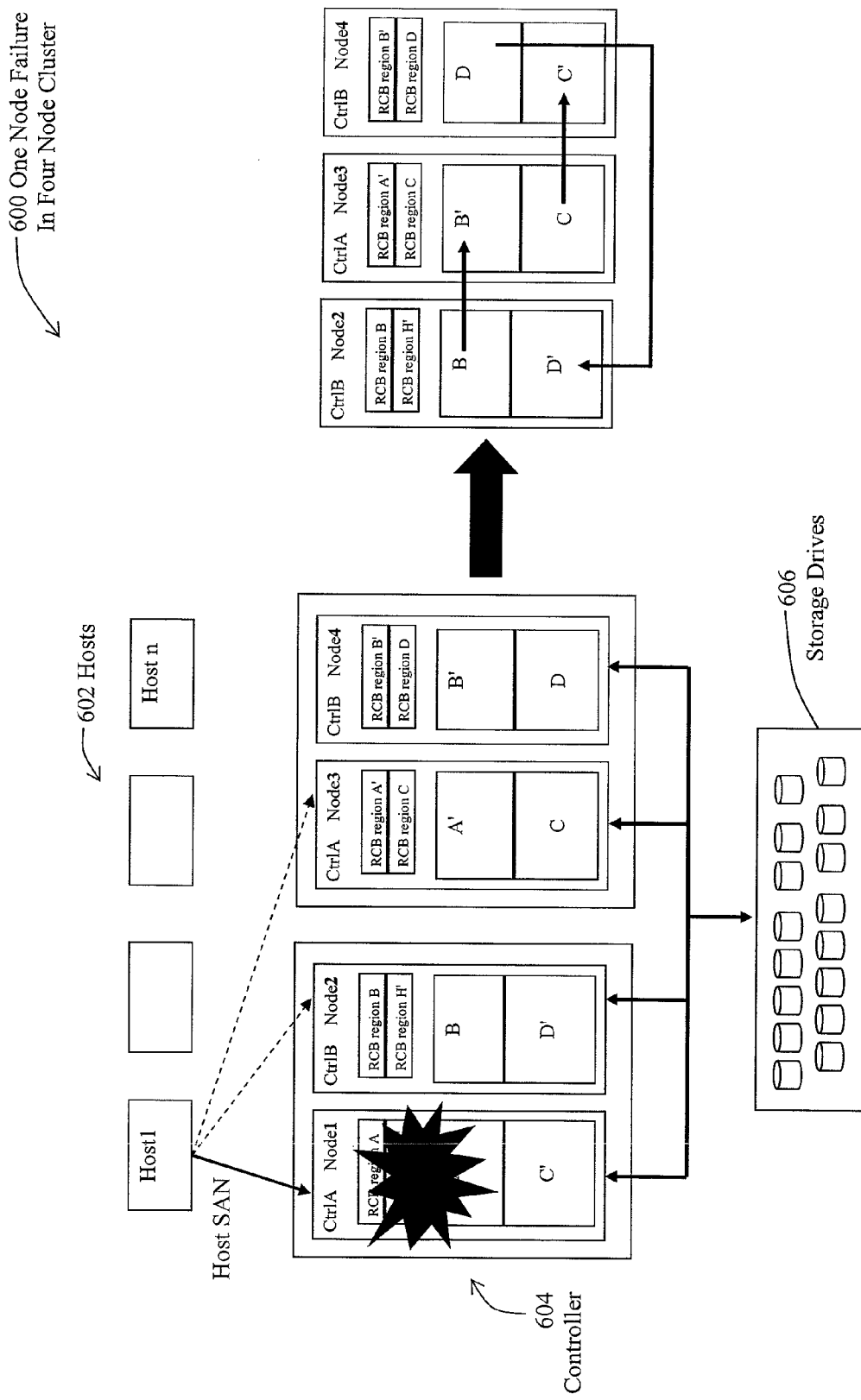
FIG. 6 is an illustration of a four node cluster which illustrates the sequence of events for recovery of a single node failure without tray loss protection.

FIG. 6 shows a four node cluster 600 with a single node failure. FIG. 6 illustrates an alternative process of recovery for a single node failure, in which surviving nodes reconfigure to operate in write back caching mode with mirroring but without tray loss protection. As shown in FIG. 6, the four node cluster 600 includes hosts 602, controllers 604 and storage drives 606. As shown in FIG. 6, node 1 fails. The surviving nodes, i.e., nodes 2, 3 and 4, mirror to the next available node, ignoring the odd/even constraints that ensure tray loss protection. As shown, node 2, node 3 and node 4 all operate in write-back mode with mirroring, so that performance of the cluster 600 is better than the performance of the cluster 500 in FIG. 5 after the single node failure recovery. Handling of single node failures in this alternative mode with or without tray loss protection is a policy decision of the storage system. In accordance with this alternative embodiment, transitions or reconfigurations of mirror partners may be time-consuming, since the entire cluster must be reconfigured by synching all of the cache data to storage drives 606. To circumvent such time-consuming operations, the cluster should wait for a timeout to determine if a failed node may return to operational mode.

Figure 7:
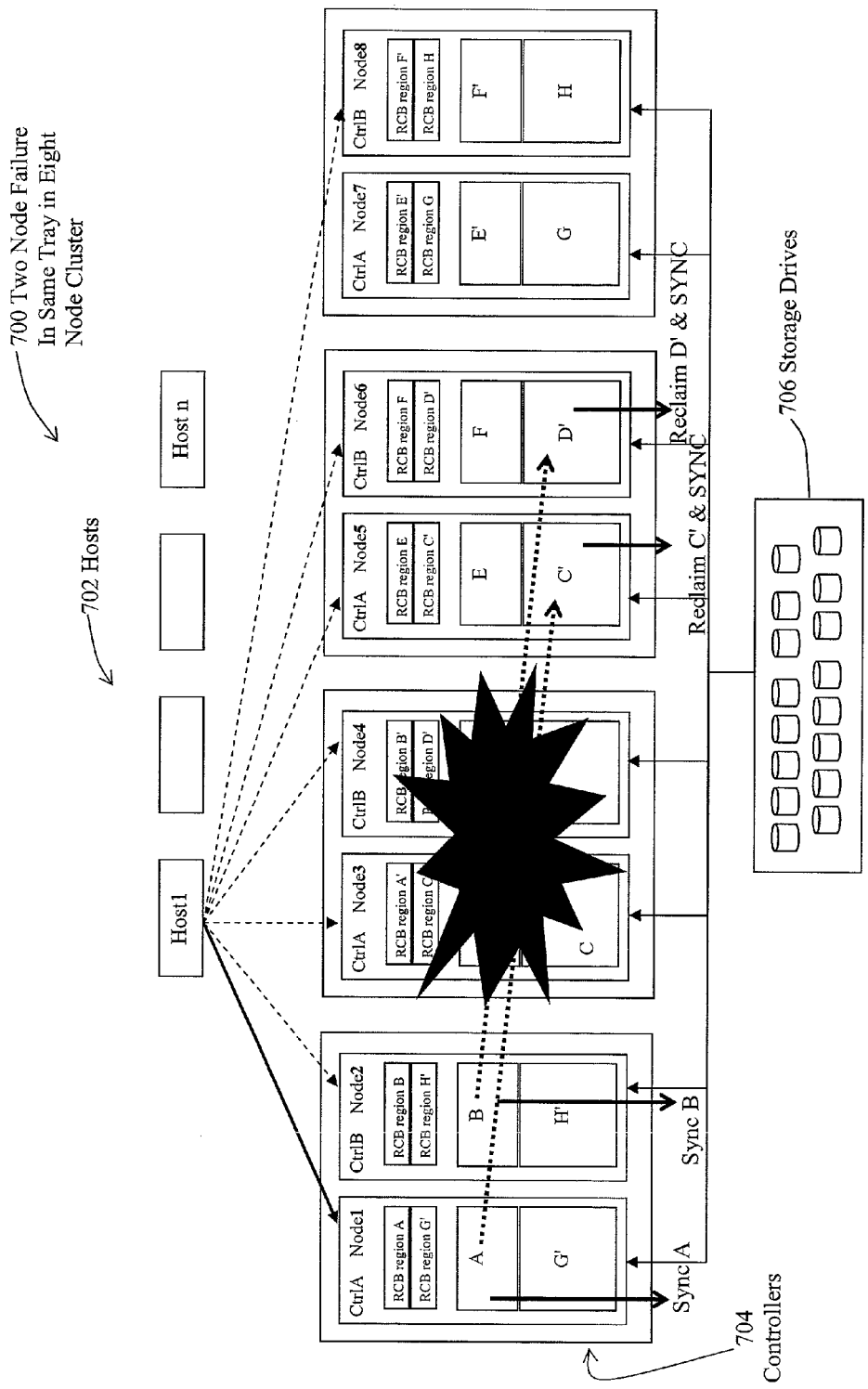
FIG. 7 is a schematic illustration of an eight node cluster with a two node failure on a single enclosure (tray).

FIG. 7 is a schematic illustration of a two node failure in a single tray of an eight node cluster 700. As shown in FIG. 7, hosts 702 communicate with controllers 704. Controllers 704 communicate with storage drives 706. As shown in FIG. 7, nodes 3 and 4 experience a failure. Nodes 3 and 4 are in the same enclosure and are disposed in both the odd round robin loop and the even round robin loop. Node 5 reclaims C' (node 3's mirror portion). Node 6 reclaims D' (node 4's mirror portion). Nodes 1 and 2 lose their mirror partners. All of the volumes of nodes 1 and 2 are put in write-through, non-mirroring, caching mode until nodes 1 and 2 find new mirror partners, which are nodes 5 and 6, respectively. Node 1 mirrors with node 5. Node 2 mirrors with node 6. All of the volumes of node 3 and node 4 are taken over by node 5 and node 6, respectively. Node 5 and node 6 continue to operate in write-back caching mode with mirroring.

Figure 8:
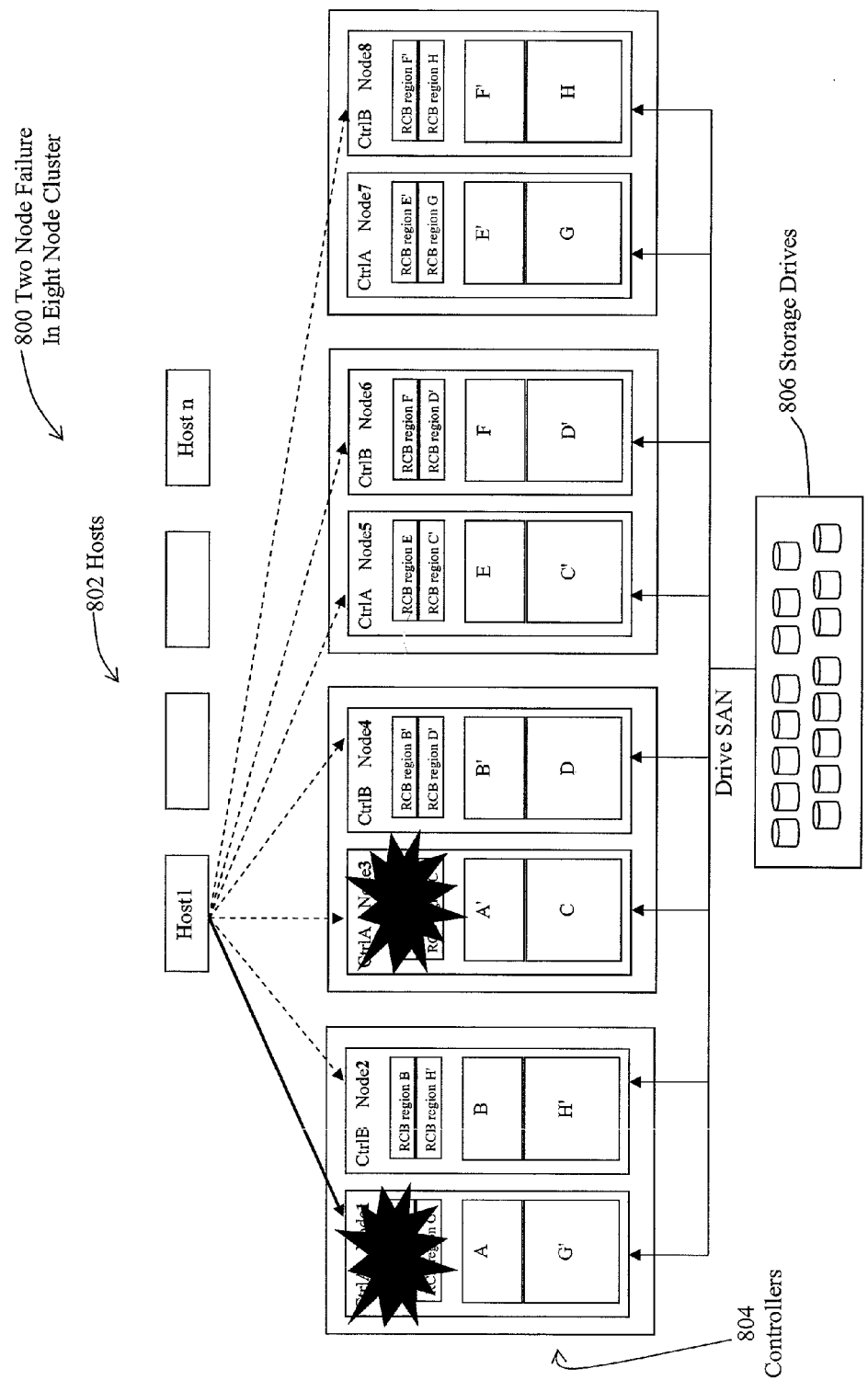
FIG. 8 is a schematic illustration of an eight node cluster with a two node failure on separate enclosures (trays).

FIG. 8 is a schematic illustration of a two node failure of nodes in separate enclosures in an eight node cluster 800. As shown in FIG. 8, hosts 802 communicate with controllers 804. Controllers 804 communicate with storage drives 806. Node 1 and node 3 of the eight node cluster 800 experience a failure. In this instance, the primary node, node 1, and the standby node, the mirror partner of node 1, which is node 3, also fails. As shown in FIG. 8, the data from node 1 is lost because node 1 has failed, which is the primary node, and the mirroring partner, node 3, has also failed. All of the volumes owned by node 1 are brought offline.

Figure 9:
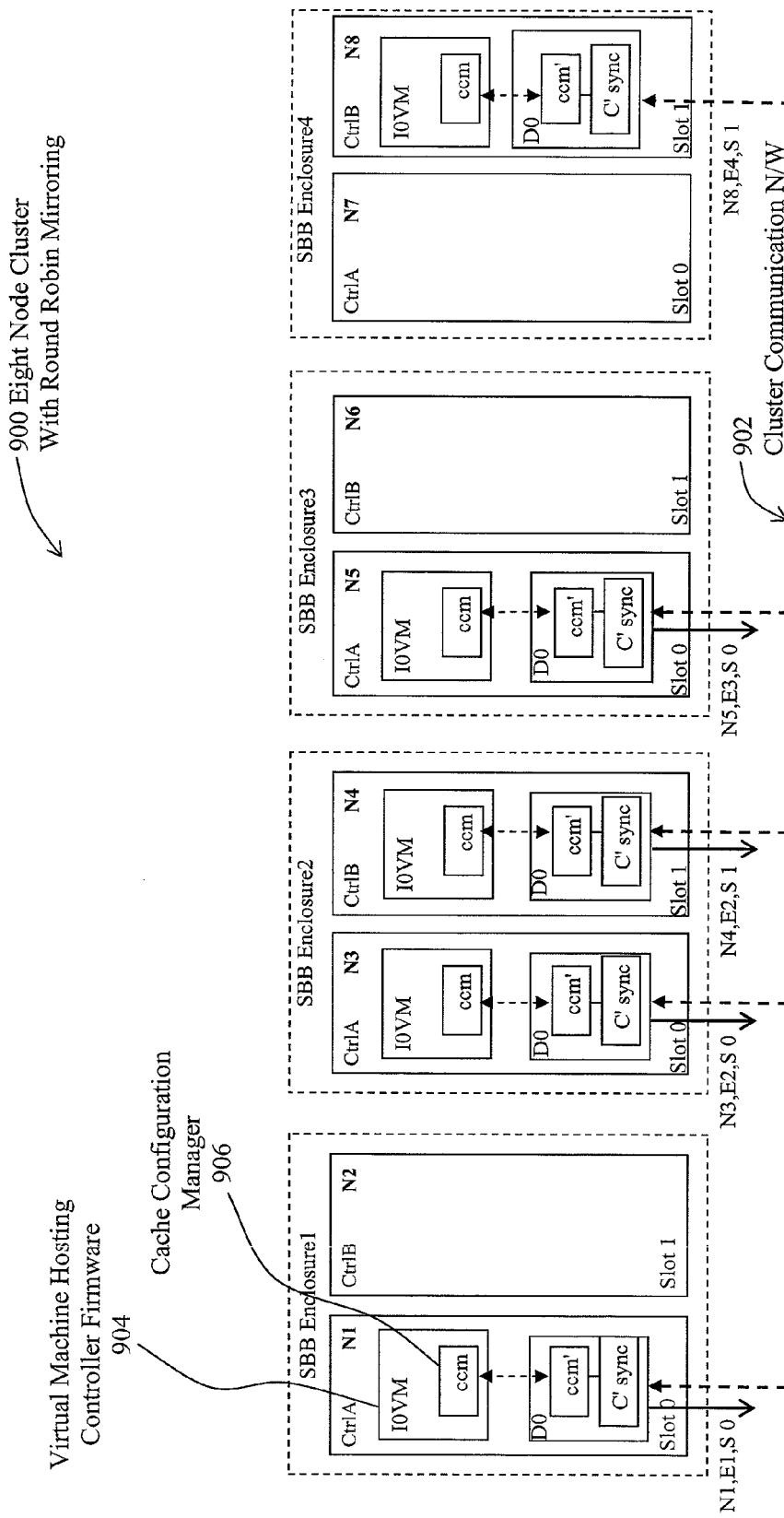
FIG. 9 is a schematic illustration of an eight node cluster illustrating mirror partner discovery.
Figure 10:
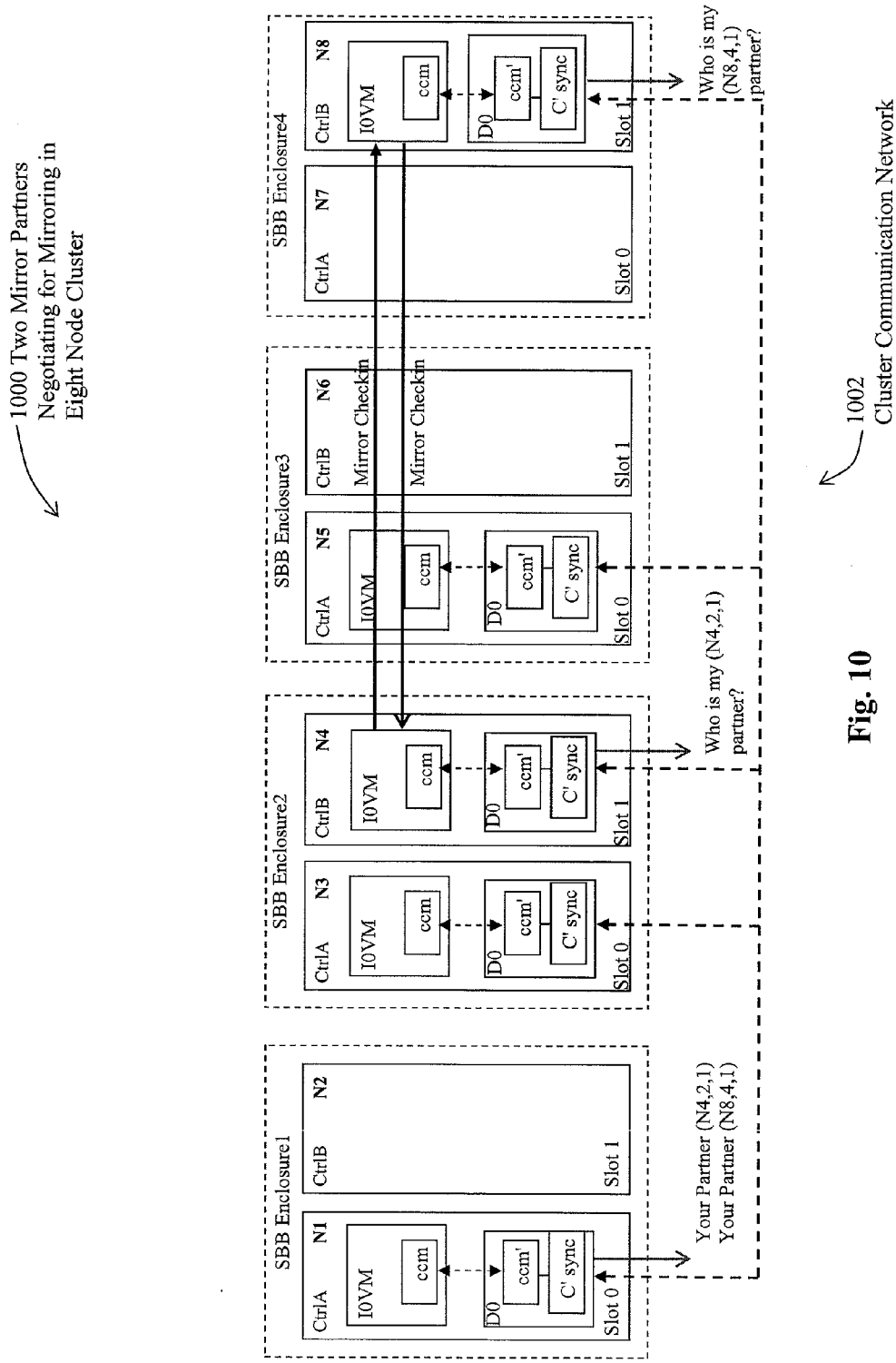
FIG. 10 is a schematic illustration of the manner in which two mirror partners negotiate for mirroring in an eight node cluster.

FIGS. 9 and 10 describe the manner in which mirror partners are discovered. When a mirror partner is chosen, the mirror partner should preferably be in a different enclosure to preserve tray loss protection, except when performance is favored over tray loss protection. As disclosed above, each of the nodes stores data in a storage portion or "primary portion." Each of the nodes also has partitioned DRAM cache for mirroring portion, or "standby" portion, for mirroring data from other nodes. In the process of establishing a mirror partner, the availability of the node as "standby" should be made known to other nodes during start of day (SOD) and when such ability is lost or gained. Cluster disturbances occur when a node fails or when nodes join or leave a cluster. During the process of discovering mirror partners, after a cluster disturbance, the cluster will reconfigure surviving nodes, so that new mirroring relationships are established automatically. As also disclosed above, each of the nodes resides in either an odd or even slot in an enclosure. The drive storage area network configurations may require that mirroring relationships be maintained between odd numbered nodes and even numbered nodes, so that input/output processes encounter fewer SAS domain hops. As further disclosed above, there are two round robin loops. One round robin loop is for odd numbered nodes, while the second round robin loop is for even numbered nodes.

As illustrated in FIG. 9, five nodes are operative in the eight node cluster 900. Node 1, node 3, node 5 are active odd numbered nodes. Node 4 and node 8 are even numbered nodes that are active in the eight node cluster 900. Node 2, Node 6 and Node 7 have either been pulled out for service or have failed. Each of the nodes includes a cache configuration manager (CCM) that manages the cache partitioning and coherency in the dual controller architecture illustrated in FIG. 9. The CCM is a part of the virtual machine hosting controller firmware (IOVM). For example, node 1 includes virtual machine hosting controller firmware (IOVM) 904 that includes a cache configuration manager (CCM) 906. A proxy instance of CCM is also initialized in the Domain0 VM of the controller (D0). This is referred to herein as the "proxy CCM" in this document.

The cluster communication network 902 allows the nodes to communicate with each other. Any desired type of communication system can be used, including Corosync, which is an Open Source Group Communication System with additional features for implementing high availability within applications. The Corosync stack is initialized through the Corosync closed process group API. Once registered, the cache configuration manager process in domain 0 (known as the proxy CCM) co-coordinates the cluster configuration for mirroring. The cache configuration manager proxy gets clustered with the Corosync stack and gets notification of all cluster events, such as nodes joining and leaving the cluster. Each proxy is able to broadcast messages to every other node in the cluster or send messages to specific nodes. Among the end proxies, one acts as a master and the rest as slaves. The master proxy runs on the node which is the "designated coordinator" in the cluster, as determined by the software during the start-of-day (SOD) procedure. The master proxy gathers the individual node profile information, including node ID, enclosure ID, and slot number, which is broadcast by each node during start-of-day (SOD) or when joining the cluster. The master proxy coordinates the mirror partner discovery using individual node profiles. During start-of-day (SOD), each of the nodes broadcasts its profile to the cluster and the master proxy records the profiles in a tabular form, such as illustrated in Table 1 below. During start-of-day (SOD), the profile database is built by the master proxy until all of the known nodes in the cluster have responded or until a specified timeout.

TABLE 1

| Node Id | Enclosure (Tray) Id | Slot No. | Available as "standby" | Current Mirror Partner. |
|---|---|---|---|---|
| N1 | E1 | S0 | Yes | None |
| N8 | E4 | S1 | Yes | None |
| N4 | E2 | S1 | Yes | None |
| N3 | E2 | S0 | Yes | None |
| N5 | E3 | S0 | Yes | None |

Table 1 above shows the individual node profile information that is gathered by the master cache configuration manager proxy. As shown in Table 1 above, the order of the broadcast forms the basic sequence of nodes for choosing mirror partners in a round robin fashion subject to whether tray loss protection is needed or not. For example, node 1 in slot 0 can have a mirror partner as node 3, which is the next available node for mirroring in slot 0, as listed in the table above. Similarly, node 3 will have a mirror partner as node 5. Node 5 will have a mirror partner as node 1, which completes the odd numbered round robin loop with tray loss protection. Similarly, node 8 and node 4 form an even numbered round robin loop with tray loss protection. With no tray loss protection, the mirror partner loop will be the natural broadcast sequence which is like node 1 mirroring to N8, node 8 mirroring to N4, node 4 mirroring to node 3, node 3 mirroring to node 5 and node 5 mirroring to N1 completing the round robin loop.

FIG. 10 illustrates an eight node cluster 1000 showing two mirror partners negotiating for mirroring. In the process of finding a mirror partner, nodes in the eight node group 1000 will query for a mirror partner by broadcasting WHO_IS_MY_PARTNER message on the cluster communication network 1002. The master proxy, which is node 1, as assumed in FIG. 10, in the eight node cluster 1000, searches for the next available even or odd numbered node. The master proxy responds on the cluster communication network 1002 to the node requesting a partner with YOUR_PARTNER message containing the target mirror node and information. In this manner, individual nodes are informed of mirror partners by a master proxy, which is shown as node 1 in the eight node cluster 1000. As illustrated in FIG. 10, node 4 and node 8 are negotiating for mirroring after nodes 4 and 8 are informed by the master node 1 that nodes 4 and 8 are mirror partners. Selection of the master node is performed by a resource manager for clusters, such as Pacemaker, during the cluster start-of-day (SOD). Node 4 and end node 8, as illustrated in FIG. 10, exchange mirror device IDs over the cluster communication network 1002. Once node 4 and node 8 are paired up, the mirroring information is copied (persisted) on each of the nodes. Similarly, when all of the nodes in the eight node cluster 1000 find mirror partners, the table above is updated, as shown in Table 2 below. Table 2 below shows profiles that are updated after all of the nodes are configured for mirroring.

TABLE 2

| Node Id | Enclosure (Tray) Id | Slot No. | Available as "standby" | Current Mirror Partner. |
|---|---|---|---|---|
| N1 | E1 | S0 | Yes | N3 |
| N8 | E4 | S1 | Yes | N4 |
| N4 | E2 | S1 | Yes | N8 |
| N3 | E2 | S0 | Yes | N5 |
| N5 | E3 | S0 | Yes | N1 |

When a new node joins the eight node cluster 1000, the new node discovers a mirror partner using the same process as disclosed above. For example, a new node broadcasts its node profile and a query for a mirror partner using the WHO_IS_MY_PARTNER message. The master proxy responds with mirror partner information subsequent to a table lookup. During the table lookup process, if the master proxy determines that some nodes in the configuration 1000 must be reconfigured to accommodate a new node in either an even numbered loop or an odd numbered loop, the affected nodes are reconfigured, forcing the affected nodes to break existing mirror relationships and sync the data to storage drives. After breaking existing mirroring relationships to accommodate a new node, the affected nodes initiate querying for new mirroring partners in accordance with the process described above.

When a node leaves a configuration, such as the eight node cluster 1000, illustrated in FIG. 10, the master proxy, such as node 1 in FIG. 10, is notified through the cluster communication network 1002. The table above is then updated, indicating a lost mirror partner. The affected nodes then query for new mirror partners using the WHO_IS_MY_PARTNER message.

Hence, mirroring partners can be established through selection of a master proxy and utilizing the cluster communication network 1002. Tray loss protection can be provided by selecting mirror partners that are disposed in different enclosures. Tray loss protection is accomplished by selecting mirror partners in a round robin process in which odd numbered nodes are mirrored with other odd numbered nodes and even numbered nodes are mirrored with other even numbered nodes. Hence, tray loss protection can be provided in an N node cluster architecture which includes multiple sets of controller nodes enclosed in enclosures with each enclosure housing dual controller nodes.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A process for establishing mirror partners in an N node storage cluster architecture to provide tray loss protection in said N node cluster comprising:
    selecting a master node from nodes in said N node cluster;
    communicating status and profile information of each node in said N node cluster on a cluster communication network to other nodes in said N node cluster, including said master node;
    recording said status and profile information in said master node;
    selecting mirror partners, using said master node, by matching odd numbered nodes with next available odd numbered nodes, and even numbered nodes with next available even numbered nodes, so that each of said nodes in said N node cluster have mirroring partners that are in different enclosures to provide tray loss protection.

2. The process of claim 1 wherein said process of communicating status and profile information of each node utilizes a cluster communication network.

3. The process of claim 2 wherein said nodes in said N node cluster utilize a cluster control manager to communicate through said cluster communication network.

4. The process of claim 1 further comprising locating a mirroring partner for an odd numbered node that is an even numbered node when no other odd numbered nodes are part of said cluster.

5. The process of claim 1 further comprising locating an odd numbered node as a mirror partner for an even numbered node when no other even numbered nodes are present in said cluster.

6. The process of claim 3 further comprising utilizing a CCM proxy in Domain 0 of the first node as said master CCM proxy.

7. A system for locating mirror partners comprising:
    a cluster of controllers that are interconnected between a plurality of hosts and a plurality of storage drives;
    a plurality of enclosures that house said controllers;
    DRAM disposed in each of said controllers that is partitioned for storage and mirroring of data from other controllers;
    a cluster communication network that interconnects said controllers;
    a master controller that selects a mirror partner for each controller of said controllers in the N node cluster, such that odd numbered nodes have a mirror partner that is the next available odd numbered node as a mirror partner, and even numbered nodes have the next available even numbered node as a mirror partner.

8. The system of claim 7 wherein any node in said cluster can function as said master node.

9. The system of claim 7 wherein said master controller can control said cluster so that said cluster reconfigures mirror partners when a new controller enters the cluster.

10. The system of claim 7 wherein reconfiguration of cache mirror partners may necessitate a cache sync operation.

11. The system of claim 7 wherein odd numbered controllers are matched with even numbered controllers when there are no other active odd numbered controllers in said cluster.

12. The system of claim 7 wherein even numbered controllers are matched with odd numbered controllers as mirror partners when there are no other even numbered controllers in said cluster.

* * * * *